United States Patent
Hou et al.

(10) Patent No.: US 12,541,665 B2
(45) Date of Patent: Feb. 3, 2026

(54) ELECTRONIC SHELF LABEL COMMUNICATION SYSTEM AND METHOD

(71) Applicant: Hanshow Technology Co., Ltd., Zhejiang (CN)

(72) Inventors: Shiguo Hou, Zhejiang (CN); Liangyan Li, Zhejiang (CN); Yunliang Feng, Zhejiang (CN); Bo Gao, Zhejiang (CN); Jun Chen, Zhejiang (CN); Qi Jiang, Zhejiang (CN); Ming Shen, Zhejiang (CN)

(73) Assignee: Hanshow Technology Co., Ltd., Jiaxing (CN)

( * ) Notice: Subject to any disclaimer, the term of this patent is extended or adjusted under 35 U.S.C. 154(b) by 0 days.

(21) Appl. No.: 18/609,957

(22) Filed: Mar. 19, 2024

(65) Prior Publication Data

US 2024/0220751 A1  Jul. 4, 2024

Related U.S. Application Data

(63) Continuation of application No. 17/634,194, filed as application No. PCT/CN2019/099891 on Aug. 9, 2019, now Pat. No. 11,977,947.

(51) Int. Cl.
*G06K 7/10* (2006.01)

(52) U.S. Cl.
CPC ................ *G06K 7/10475* (2013.01)

(58) Field of Classification Search
CPC ......... G06K 7/10475; H04W 52/0235; H04W 4/50; H04W 4/08; G06Q 10/063;
(Continued)

(56) References Cited

U.S. PATENT DOCUMENTS 9,298,958 B1 * 3/2016 Amir ................. H04W 52/0216
10,031,575 B2 7/2018 Meng
(Continued)

FOREIGN PATENT DOCUMENTS

| CN | 101578062 A | 11/2009 |
|---|---|---|
| CN | 101833683 A | 9/2010 |

(Continued)

OTHER PUBLICATIONS

CN 108924870A—A method and system for use of electronic price tag, 13 pages. (Year: 2024).*
(Continued)

*Primary Examiner* — Tuyen K Vo
(74) *Attorney, Agent, or Firm* — Hanley, Flight & Zimmerman, LLC (57) ABSTRACT

An electronic shelf label communication system and method. The system includes a processor, a plurality of wireless access points and an electronic shelf label. The electronic shelf label is configured to actively send a heartbeat data package to the plurality of wireless access points after periodically waking up. Each of the plurality of wireless access points is configured to: receive the heartbeat data package of the electronic shelf label, obtain signal strength data when the heartbeat data package of the electronic shelf label is received, and send the signal strength data to the processor. The processor is configured to: receive the signal strength data corresponding to the heartbeat data package sent by the plurality of wireless access points, and determine an optimal wireless access point corresponding to the electronic shelf label according to the signal strength data.

20 Claims, 4 Drawing Sheets

(58) Field of Classification Search
CPC ......... G06Q 30/06; H04L 67/34; H04L 67/62; Y02D 30/70
See application file for complete search history.

(56) References Cited

U.S. PATENT DOCUMENTS

| | | | |
|---|---|---|---|
| 11,977,947 B2 | 5/2024 | Hou et al. | |
| 2003/0132833 A1 | 7/2003 | Haulk et al. | |
| 2007/0131764 A1* | 6/2007 | Wallace | G06K 17/0022 235/383 |
| 2010/0060434 A1 | 3/2010 | Shiotsu et al. | |
| 2011/0140861 A1* | 6/2011 | Amir | G01S 13/825 340/10.3 |
| 2011/0240731 A1 | 10/2011 | Lee | |
| 2011/0316676 A1 | 12/2011 | Bajic et al. | |
| 2013/0322418 A1 | 12/2013 | Ho et al. | |
| 2014/0082147 A1 | 3/2014 | Pazos et al. | |
| 2014/0129393 A1 | 5/2014 | Soon-Shiong | |
| 2014/0177604 A1* | 6/2014 | Lee | H04W 52/0212 370/336 |
| 2014/0353368 A1 | 12/2014 | Connolly | |
| 2015/0278890 A1 | 10/2015 | Yang | |
| 2015/0348449 A1 | 12/2015 | Choi | |
| 2015/0348450 A1 | 12/2015 | Park | |
| 2016/0049102 A1 | 2/2016 | Lee et al. | |
| 2017/0169675 A1* | 6/2017 | Burgess | G08B 13/08 |
| 2017/0293959 A1* | 10/2017 | Itou | G06Q 30/0623 |
| 2020/0293983 A1* | 9/2020 | Hu | G06Q 10/0875 |

FOREIGN PATENT DOCUMENTS

| | | | |
|---|---|---|---|
| CN | 105654155 A | 6/2016 | |
| CN | 106658689 A | 5/2017 | |
| CN | 108898203 A | 11/2018 | |
| CN | 108924870 A | 11/2018 | |
| CN | 109729550 A | 5/2019 | |
| CN | 109831753 A | 5/2019 | |
| EP | 2372619 A1 | 10/2011 | |
| EP | 2750095 A1 | 7/2014 | |
| EP | 2750096 A1 | 7/2014 | |
| EP | 3287890 A2 | 2/2018 | |
| JP | 2014130561 A | 7/2014 | |
| JP | 2014183496 A | 9/2014 | |
| JP | 2015530057 A | 10/2015 | |
| JP | 2018157345 A | 10/2018 | |
| KR | 20160020265 A | 2/2016 | |
| KR | 20190044821 A | * 5/2019 | ............... G01S 1/68 |

OTHER PUBLICATIONS

International Searching Authority, "International Search Report and Written Opinion", issued in connection with PCT Application No. PCT/CN2019/099891 with English Translation, dated Apr. 20, 2020, 8 pages.

International Bureau, "International Preliminary Report on Patentability," issued in connection with International Patent Application No. PCT/CN2019/099891, dated Feb. 8, 2022, 8 pages. [English Translation Included].

China National Intellectual Property Administration, "Search Report", issued in connection with Chinese Application No. 201910732826.X, dated Apr. 22, 2022, 5 pages. [English Translation Included].

China National Intellectual Property Administration, "First Notification of Office Action", issued in connection with Chinese Application No. 201910732826.X, May 6, 2022, 9 pages. [English Translation Included].

China National Intellectual Property Administration, "Search Report", issued in connection with Chinese Application No. 201910732826.X, Oct. 9, 2022, 5 pages. [English Translation Included].

European Patent Office, "Extended European Search Report", issued in connection with European Application No. 19941392.3, Dec. 15, 2022, 8 pages.

State Intellectual Property Office of People's Republic of China, "Notification to Grant Patent Right for Invention", issued in connection with Chinese Application No. 201910732826.X, dated Jan. 13, 2023, 3 pages. [English Translation Included].

IP Australia "Examination Report No. 1 for Standard Patent Application", issued in connection with Australian Application No. 2019461859, Feb. 2, 2023, 3 pages.

Japan Patent Office, "Notice of Reasons for Refusal," issued in connection with Japanese Patent Application No. 2022-508583, dated Mar. 13, 2023, 8 pages (English translation included).

United States Patent and Trademark Office, "Non-Final Office Action," issued in connection with U.S. Appl. No. 17/634,194, dated Apr. 21, 2023, 11 pages.

Japan Patent Office, "Decision to Grant a Patent," issued in connection with Japanese Patent Application No. 2022-508583, dated Aug. 2, 2023, 5 pages.

United States Patent and Trademark Office, "Final Office Action," issued in connection with U.S. Appl. No. 17/634,194, dated Aug. 11, 2023, 9 pages.

United States Patent and Trademark Office, "Advisory Action," issued in connection with U.S. Appl. No. 17/634,194, dated Nov. 1, 2023, 2 pages.

IP Australia, "Notice of acceptance for patent application," issued in connection with Australian Application No. 2019461859, dated Nov. 13, 2023, 3 pages.

United States Patent and Trademark Office, "Notice of Allowance," issued in connection with U.S. Appl. No. 17/634,194, dated Dec. 19, 2023, 8 pages.

United States Patent and Trademark Office, "Corrected Notice of Allowability," issued in connection with U.S. Appl. No. 17/634,194, dated Jan. 10, 2024, 2 pages.

European Patent Office, "Extended European Search Report", issued in connection with European Application No. 24190725.2, Sep. 6, 2024, 8 pages.

European Patent Office, "Communication under Rule 71(3) EPC", issued in connection with European Application No. 19941392.3, Apr. 19, 2024, 9 pages.

European Patent Office, "Communication under Rule 71(3) EPC", issued in connection with European Application No. 19941392.3, Sep. 5, 2024, 9 pages.

European Patent Office, "Communication pursuant to Article 94(3) EPC," issued in connection with European Patent Application No. 24190725.2, dated Dec. 3, 2025, 7 pages.

* cited by examiner

401 — sending, upon receipt of electronic shelf label update data sent by a processor, a group wakeup message to an electronic shelf label requiring data update, wherein the group wakeup message comprises a plurality of countdown durations for receiving update data by the electronic shelf label requiring data update, and the update data comprises a plurality of update data packages;

402 — sending, after the electronic shelf label requiring data update wakes up according to each of the countdown durations for receiving the update data, the unsent update data packages corresponding to the electronic shelf label to electronic shelf labels requiring data update in a same electronic shelf label group simultaneously, until all of the update data packages corresponding to the electronic shelf label are sent.

FIG. 4

501 — waking up periodically, receiving a group wakeup message and obtain a plurality of countdown durations for receiving update data, wherein the update data comprises a plurality of update data packages;

502 — waking up again according to each of the countdown durations for receiving the update data, and receiving the unreceived update data packages once, until all of the update data packages are received.

ELECTRONIC SHELF LABEL COMMUNICATION SYSTEM AND METHOD

CROSS-REFERENCE TO RELATED APPLICATIONS

This application is a continuation of U.S. patent application Ser. No. 17/634,194, filed on Feb. 9, 2022, which is a National Stage of International Application No. PCT/CN2019/099891, filed on Aug. 9, 2019. The above applications are hereby incorporated by reference in their entireties.

TECHNICAL FIELD

The present disclosure relates to a technical field of electronic shelf labels, and particularly to an electronic shelf label communication system and a method.

BACKGROUND

Paper shelf labels are used in traditional supermarket. In recent years, many sales models combining online sales and offline sales are used in the supermarket to improve sales efficiency, so electronic shelf labels have occurred to replace the paper shelf labels. The existing electronic shelf label system communications in a wireless, wired or infrared mode. As the number of electronic shelf labels in large supermarkets is very large, it has become an urgent problem to improve the efficiency of communication between the electronic shelf label and the processor while achieving an excellent low power consumption effect.

SUMMARY

An embodiment of the present disclosure proposes an electronic shelf label communication system including a processor, a plurality of wireless access points and an electronic shelf label. The electronic shelf label is configured to actively send a heartbeat data package to the plurality of wireless access points after periodically waking up. Each of the plurality of wireless access points is configured to: receive the heartbeat data package of the electronic shelf label, obtain signal strength data when the heartbeat data package of the electronic shelf label is received, and send the signal strength data to the processor. The processor is configured to: receive the signal strength data corresponding to the heartbeat data package sent by the plurality of wireless access points, and determine an optimal wireless access point corresponding to the electronic shelf label according to the signal strength data.

An embodiment of the present disclosure proposes an electronic shelf label communication method, including: actively sending, by an electronic shelf label, a heartbeat data package to a plurality of wireless access points after the electronic shelf label periodically wakes up, wherein signal strength data when the heartbeat data package is received by the wireless access points is obtained by the wireless access points and is sent to a processor by the wireless access points for being used by the processor to determine an optimal wireless access point corresponding to the electronic shelf label.

An embodiment of the present disclosure proposes an electronic shelf label communication method, including: receiving, by a plurality of wireless access points, a heartbeat data package that is actively sent by an electronic shelf label, and obtaining, by the plurality of wireless access points, signal strength data when the heartbeat data package of the electronic shelf label is received; and sending, by the plurality of wireless access points, the signal strength data corresponding to the heartbeat data package to a processor, wherein the signal strength data is to be used by the processor to determine an optimal wireless access point corresponding to the electronic shelf label.

An embodiment of the present disclosure proposes an electronic shelf label communication system to realize communications between an electronic shelf label and a processor, with a high efficiency and a low power consumption, the system comprises:

a processor, a plurality of wireless access points and a plurality of electronic shelf label groups, wherein each of the wireless access points is corresponding to the plurality of electronic shelf label groups, and each of the electronic shelf label groups comprises a plurality of electronic shelf labels;

the processor is configured to send update data comprising a plurality of update data packages to the wireless access point corresponding to the electronic shelf label group where the electronic shelf label requiring data update is located;

the wireless access point is configured to send, upon receipt of the update data sent by the processor, a group wakeup message to the electronic shelf label requiring data update, wherein the group wakeup message comprises a plurality of countdown durations for receiving the update data by the electronic shelf label requiring data update; and send, after the electronic shelf label requiring data update wakes up according to each of the countdown durations for receiving the update data, the unsent update data packages corresponding to the electronic shelf label to electronic shelf labels requiring data update in a same electronic shelf label group simultaneously, until all of the update data packages corresponding to the electronic shelf label are sent;

the electronic shelf label is configured to wake up periodically, receive the group wakeup message and obtain the plurality of countdown durations for receiving the update data; and wake up again according to each of the countdown durations for receiving the update data, and receive the unreceived update data packages once, until all of the update data packages are received.

An embodiment of the present disclosure provides an electronic shelf label communication method to realize communications between an electronic shelf label and a processor, with high efficiency and low power consumption, the method comprises:

sending, upon receipt of electronic shelf label update data sent by a processor, a group wakeup message to an electronic shelf label requiring data update, wherein the group wakeup message comprises a plurality of countdown durations for receiving update data by the electronic shelf label requiring data update, and the update data comprises a plurality of update data packages; and sending, after the electronic shelf label requiring data update wakes up according to each of the countdown durations for receiving the update data, the unsent update data packages corresponding to the electronic shelf label to electronic shelf labels requiring data update in a same electronic shelf label group simultaneously, until all of the update data packages corresponding to the electronic shelf label are sent.

An embodiment of the present disclosure provides an electronic shelf label communication method to realize communications between an electronic shelf label and a processor, with high efficiency and low power consumption, the method comprises:

waking up periodically, receiving a group wakeup message and obtain a plurality of countdown durations for receiving update data, wherein the update data comprises a plurality of update data packages; and     waking up again according to each of the countdown durations for receiving the update data, and receiving the unreceived update data packages once, until all of the update data packages are received.

An embodiment of the present disclosure provides an electronic shelf label communication apparatus to realize communications between an electronic shelf label and a processor, with high efficiency and low power consumption, the apparatus comprises:

a group wakeup message sending module configured to send, upon receipt of electronic shelf label update data sent by a processor, a group wakeup message to an electronic shelf label requiring data update, wherein the group wakeup message comprises a plurality of countdown durations for receiving update data by the electronic shelf label requiring data update, and the update data comprises a plurality of update data packages; and     an update data sending module configured to send, after the electronic shelf label requiring data update wakes up according to each of the countdown durations for receiving the update data, the unsent update data packages corresponding to the electronic shelf label to electronic shelf labels requiring data update in a same electronic shelf label group simultaneously, until all of the update data packages corresponding to the electronic shelf label are sent.

An embodiment of the present disclosure provides an electronic shelf label communication apparatus to realize communications between an electronic shelf label and a processor, with high efficiency and low power consumption, the apparatus comprises:

a group wakeup message receiving module configured to wake up periodically, receive a group wakeup message and obtain a plurality of countdown durations for receiving update data, wherein the update data comprises a plurality of update data packages; and     an update data receiving module configured to wake up again according to each of the countdown durations for receiving the update data, and receive the unreceived update data packages once until all of the update data packages are received.

An embodiment of the present disclosure provides a computer device comprising a memory, a processor, and a computer program stored in the memory and executable on the processor, wherein the processor is configured to execute the computer program to implement the aforementioned electronic shelf label communication method.

An embodiment of the present disclosure provides a computer-readable storage medium, storing a computer program for implementing the aforementioned electronic shelf label communication method.

In the embodiments of the present disclosure, the electronic shelf label wakes up periodically to receive the group wakeup message, and wakes up again according to each of the countdown durations for receiving the update data to receive unreceived update data packages once, until all of the update data packages are received, so that the power consumption of the electronic shelf label in an unawakened state is very low; after the electronic shelf label requiring data update wakes up according to each of the countdown durations for receiving the update data, the wireless access point simultaneously sends the unsent update data packages corresponding to the electronic shelf label to electronic shelf labels requiring data update in a same electronic shelf label group, until all of the update data packages corresponding to the electronic shelf label are sent, so that when the wireless access point simultaneously sends the update data packages to the electronic shelf labels requiring data update in the same electronic shelf label group, the adjacent update data packages, which are sent by the wireless access point, are sent to different electronic shelf labels, and there is a time interval, i.e., a countdown duration for receiving the update data, between different batches of update data packages of the same electronic shelf label, thereby providing the electronic shelf label with enough time to process the update data packages, and improving the communication efficiency of the plurality of electronic shelf label groups.

BRIEF DESCRIPTION OF DRAWINGS

The following drawings are used for a clear understanding of the present disclosure and constitute a part of the present disclosure, and shall not be construed as any limitation to the present disclosure. In the drawings.

DESCRIPTION OF EMBODIMENTS

For a clearer understanding of the objects, technical features and effects of this disclosure, specific embodiments will now be described with reference to the drawings. The described embodiments are intended only to schematically illustrate and explain this disclosure and do not limit the scope of this disclosure.

Figure 1:
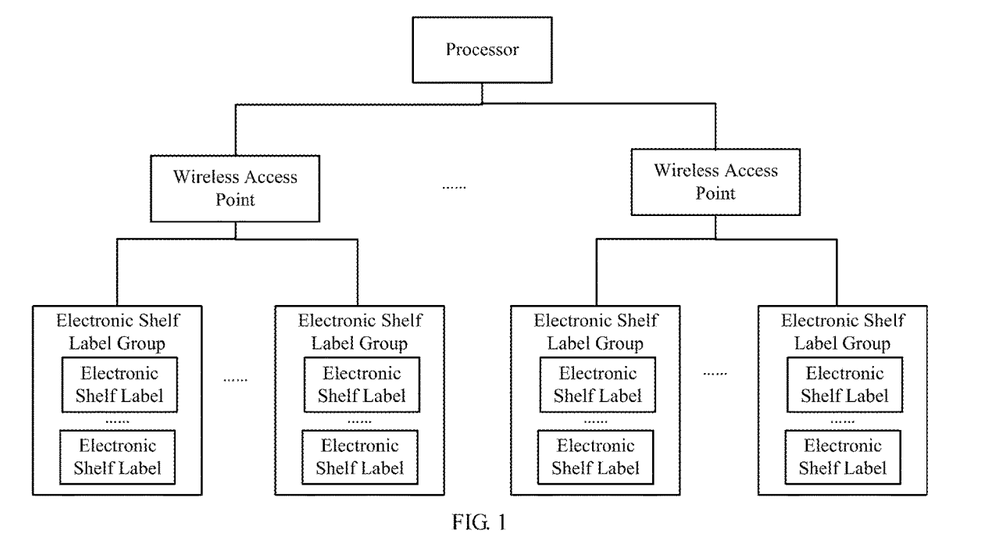
FIG. 1 is a schematic diagram of an electronic shelf label communication system in an embodiment of the present disclosure.

FIG. 1 is a schematic diagram of an electronic shelf label communication system in an embodiment of the present disclosure. As illustrated in FIG. 1, the system comprises:

a processor, a plurality of wireless access points and a plurality of electronic shelf label groups, wherein     each of the wireless access points is corresponding to the plurality of electronic shelf label groups, and each of the electronic shelf label groups comprises a plurality of electronic shelf labels;

the processor is configured to send update data comprising a plurality of update data packages to the wireless access point corresponding to the electronic shelf label group where the electronic shelf label requiring data update is located;

the wireless access point is configured to:
send, upon receipt of the update data sent by the processor, a group wakeup message to the electronic shelf label requiring data update, wherein the group wakeup message comprises a plurality of countdown durations for receiving the update data by the electronic shelf label requiring data update; and
send, after the electronic shelf label requiring data update wakes up according to each of the countdown durations for receiving the update data, the unsent update data packages corresponding to the electronic shelf label to the electronic shelf labels requiring data update in a same electronic shelf label group simultaneously, until all of the update data packages corresponding to the electronic shelf label are sent;

the electronic shelf label is configured to:
wake up periodically, receive the group wakeup message and obtain the plurality of countdown durations for receiving the update data; and
wake up again according to each of the countdown durations for receiving the update data, and receive the unreceived update data packages once, until all of the update data packages are received.

In the embodiment of the present disclosure, the electronic shelf label wakes up periodically to receive the group wakeup message, and wakes up again according to each of the countdown durations for receiving the update data to receive the unreceived update data packages once, until all of the update data packages are received, so that the power consumption of the electronic shelf label in an unawakened state is very low. After the electronic shelf label requiring data update wakes up according to each of the countdown durations for receiving the update data, the wireless access point simultaneously sends the unsent update data packages corresponding to the electronic shelf label to electronic shelf labels requiring data update in a same electronic shelf label group, until all of the update data packages corresponding to the electronic shelf label are sent, so that when the wireless access point simultaneously sends the update data packages to the electronic shelf labels requiring data update in the same electronic shelf label group, the adjacent update data packages, which are sent by the wireless access point, are sent to different electronic shelf labels, and there is a time interval, i.e., a countdown duration for receiving the update data, between different batches of update data packages of the same electronic shelflabel, thereby giving the electronic shelf label enough time to process the update data packages, and improving the communication efficiency of the plurality of electronic shelf label groups.

During implementation, the processor stores a corresponding relationship between each of the electronic shelf labels and a commodity in a supermarket. The processor also manages the plurality of wireless access points distributed in one or more supermarkets, including wireless channel information of the wireless access points, such as wireless operating frequencies and operation initiating commands. The processor generates content that a corresponding electronic shelf label should display according to data sent by a background ERP database of the supermarket to form update data of the electronic shelf label requiring data update, finds a wireless access point corresponding to an electronic shelf label group where the electronic shelf label is located, sends the update data to the wireless access point, and finally sends the data to the electronic shelf label by the wireless access point.

In order to reduce power consumption, the electronic shelf label is in an unawakened state by default, and can receive the group wakeup message after waking up. Upon receipt of the update data sent by the processor, the wireless access point sends the group wakeup message to the electronic shelf label requiring data update. Therefore, to make the electronic shelf label able to receive the group wakeup message, a duration of sending the group wakeup message by the wireless access point should cover the time interval between two times of waking up of the electronic shelf label to receive the group wakeup message. The group wakeup message includes a plurality of countdown durations for receiving the update data by the electronic shelf label requiring data update. Upon receipt of the group wakeup message, the electronic shelf label obtains a plurality of countdown durations for receiving the update data. The electronic shelf label counts down timing of each of the countdown durations for receiving the update data, and wakes up again according to each of the countdown durations for receiving the update data to receive the update data.

Since the electronic shelf labels require low power consumption, the Microcontroller Unit (MCU) used for each of the electronic shelf labels usually has a weak operational capability. If the wireless access point only communicates with one electronic shelf label each time and continuously sends the update data packages, the MCU with low power consumption will have no time to process these update data packages, so a group communication mode is adopted. The wireless access point can simultaneously communicate with a plurality of electronic shelf labels requiring data update, and the adjacent data packages are sent to different electronic shelf labels. After the electronic shelf label requiring data update wakes up according to each of the countdown durations for receiving the update data, the unsent update data packages corresponding to the electronic shelf label are sent to electronic shelf labels requiring data update in a same electronic shelf label group, until all of the update data packages corresponding to the electronic shelf label are sent, so that there is a time interval, i.e., a countdown duration for receiving the update data, between different batches of update data packages of the same electronic shelf label, thereby providing the electronic shelf label with enough time to process the update data packages, and improving the communication efficiency of the plurality of electronic shelf label groups, thus effectively considering the group communication efficiency and the low power consumption of each of the electronic shelf labels.

During implementation, since each of the electronic shelf label groups where the electronic shelf label is located is corresponding to a wireless access point, and the update data is transmitted between the processor and the electronic shelf label by the wireless access point, the communication between the wireless access points for the electronic shelf labels is very important, and it is necessary to ensure that each of the electronic shelf labels is corresponding to an optimal wireless access point.

In one embodiment, the electronic shelf label is further configured to send a heartbeat data package to the plurality of wireless access points after waking up periodically;

the wireless access point is further configured to:
receive the heartbeat data packages of the electronic shelf label, and obtain signal strength data when the heartbeat data package of the electronic shelf label is received; and send the signal strength data corresponding to the heartbeat data package of the electronic shelf label to the processor;

the processor is further configured to:
receive the signal strength data corresponding to the heartbeat data packages of the plurality of electronic shelf labels sent by the plurality of wireless access points, and determine an optimal wireless access point corresponding to each electronic shelf label according to the received signal strength data; and network the electronic shelf label according to the optimal wireless access point, when the optimal wireless access point corresponding to the electronic shelf label is inconsistent with a current wireless access point.

In the above embodiment, after waking up periodically, the electronic shelf label actively sends the heartbeat data packages to the plurality of wireless access points, and the period may be 3 minutes or more. The specific process may be that the wireless access point turns on a heartbeat receiving function on a public wireless channel when the system is in a silent state; the electronic shelf label sends the heartbeat data package on the public channel, and the plurality of wireless access points will receive the heartbeat data package and obtain the signal strength data when the heartbeat data package of the electronic shelf label is received, and send the signal strength data corresponding to the heartbeat data package of the electronic shelf label to the processor; the processor receives the signal strength data corresponding to the heartbeat data package of the plurality of electronic shelf labels sent by the plurality of wireless access points, and determines an optimal wireless access point corresponding to each electronic shelf label according to the received signal strength data, i.e., determines a wireless access point used by the electronic shelf label to realize an optimization of data update, and when the optimal wireless access point corresponding to the electronic shelf label is inconsistent with a current wireless access point, networks the electronic shelf label according to the optimal wireless access point.

During implementation, there are a plurality of methods for the processor to network the electronic shelf labels according to the optimal wireless access point, and one embodiment will be given below.

In an embodiment, the step of networking the electronic shelf labels by the processor according to the optimal wireless access point comprises:

generating and sending wireless channel information to the optimal wireless access point, wherein the wireless channel information comprises an electronic shelf label identifier, and a set wireless channel instruction sent by the optimal wireless access point to the electronic shelf label corresponding to the electronic shelf label identifier; and modifying a group number of the electronic shelf label group where the electronic shelf label is located into a group number of one of the electronic shelf label groups corresponding to the optimal wireless access point.

In the above embodiment, after the optimal wireless access point sends the set wireless channel instruction to the electronic shelf label corresponding to the electronic shelf label identification, the corresponding electronic shelf label establishes a corresponding relationship between the optimal wireless access point and the electronic shelf label through the set wireless channel instruction. Through the set wireless channel instruction, the electronic shelf label wakes up again according to each of the countdown durations for receiving the update data to receive unreceived update data packages once. A group number of the electronic shelf label group where the electronic shelf label is located is modified into a group number of one of electronic shelf label groups corresponding to the optimal wireless access point. For example, a wireless access point A may correspond to electronic shelf label groups 1, 2, and 3, if an electronic shelf label is in an electronic shelf label group 4, and the optimal wireless access point determined by the above process is A, a group number of an electronic shelf label group where the electronic shelf label is located can be modified, i.e., a logical group number of the electronic shelf label is modified to 1, 2, or 3. Theoretically, all electronic shelf labels with a same logical group number are similar in physical locations, and probably may use a same wireless access point for communications. Thus, the group communication can reach the highest communication efficiency while considering low power consumption.

During implementation, the electronic shelf label may have various structures, and one embodiment will be given below.

In an embodiment, the electronic shelf label comprises a memory, a controller and a display, wherein, the memory is configured to store the update data; and
the controller is configured to control the display to display data.

In the above embodiment, the display may be a graphic display with at least one display area. The graphic display may display price, name, place of origin and promotion information of a product by a dot matrix. Of course, the graphic display is only an example, and other forms of displays such as a dot matrix display may also be used, and related variations should fall within the scope of the present disclosure. The memory has a set of registers for storing update data. The structure of the electronic shelf label can enable the electronic shelf label to store as much data as possible and display the data as needed.

In an embodiment, the update data comprises an electronic shelf label identifier and at least one picture;

the processor is specifically configured to generate, according to attribute information of a commodity, at least one picture of the commodity; and generate the electronic shelf label identifier corresponding to the at least one picture of the commodity according to a binding relationship between the commodity and the electronic shelf label.

In the above embodiment, the processor sends the at least one picture of the commodity to the corresponding electronic shelf label by the wireless access point, after generating the at least one picture of the commodity. A binding relationship between the commodity and the electronic shelf label is stored in the processor and managed, e.g., modified, by the processor.

In one embodiment, the update data comprises electronic shelf label display control information;

the controller of the electronic shelf label is specifically configured to control the display of the electronic shelf label to display picture, upon receipt of the electronic shelf label display control information.

In the above embodiment, the electronic shelf label display control information may comprise an electronic shelf label identifier, a picture that the electronic shelf label should display, etc. The electronic shelf label display control information may not be simultaneously sent with the at least one picture. That is, the update data package received by one electronic shelf label does not include the electronic shelf label display control information in one data update, and the update data package includes the electronic shelf label display control information in the next data update. The picture that the electronic shelf label should display may be a serial number of the picture in the memory of the electronic shelf label, for example, an order of the picture among all pictures in the memory, or an identification number of the picture, which can be determined according to the actual situation.

Figure 2:
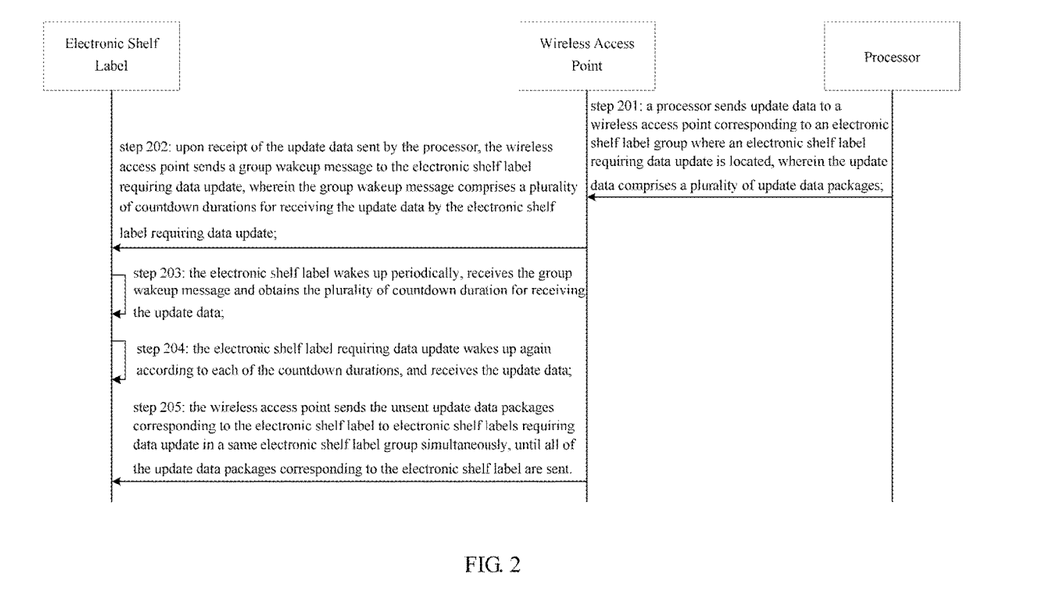
FIG. 2 is a detailed flowchart of updating data using an electronic shelf label communication system in an embodiment of the present disclosure.

Based on the above embodiments, an embodiment is given below to explain a detailed flow of updating data using an electronic shelf label communication system. FIG. 2 is a detailed flowchart of updating data using an electronic shelf label communication system in an embodiment of the present disclosure. As illustrated in FIG. 2, the flow comprises:

step 201: a processor sends update data to a wireless access point corresponding to an electronic shelf label group where an electronic shelf label requiring data update is located, wherein the update data comprises a plurality of update data packages;

step 202: upon receipt of the update data sent by the processor, the wireless access point sends a group wakeup message to the electronic shelf label requiring data update, wherein the group wakeup message comprises a plurality of countdown durations for receiving the update data by the electronic shelf label requiring data update;

step 203: the electronic shelf label wakes up periodically, receives the group wakeup message and obtains the plurality of countdown duration for receiving the update data;

step 204: the electronic shelf label requiring data update wakes up again according to each of the countdown durations, and receives the update data;

step 205: the wireless access point sends the unsent update data packages corresponding to the electronic shelf label to electronic shelf labels requiring data update in a same electronic shelf label group simultaneously, until all of the update data packages corresponding to the electronic shelf label are sent.

Of course, it can be understood that although a detailed process of updating data using an electronic shelf label communication system has been given above, any other process of a data update using an electronic shelf label communication system can also be derived according to the above embodiments, and relevant variations should fall within the scope of the present disclosure.

Figure 3:
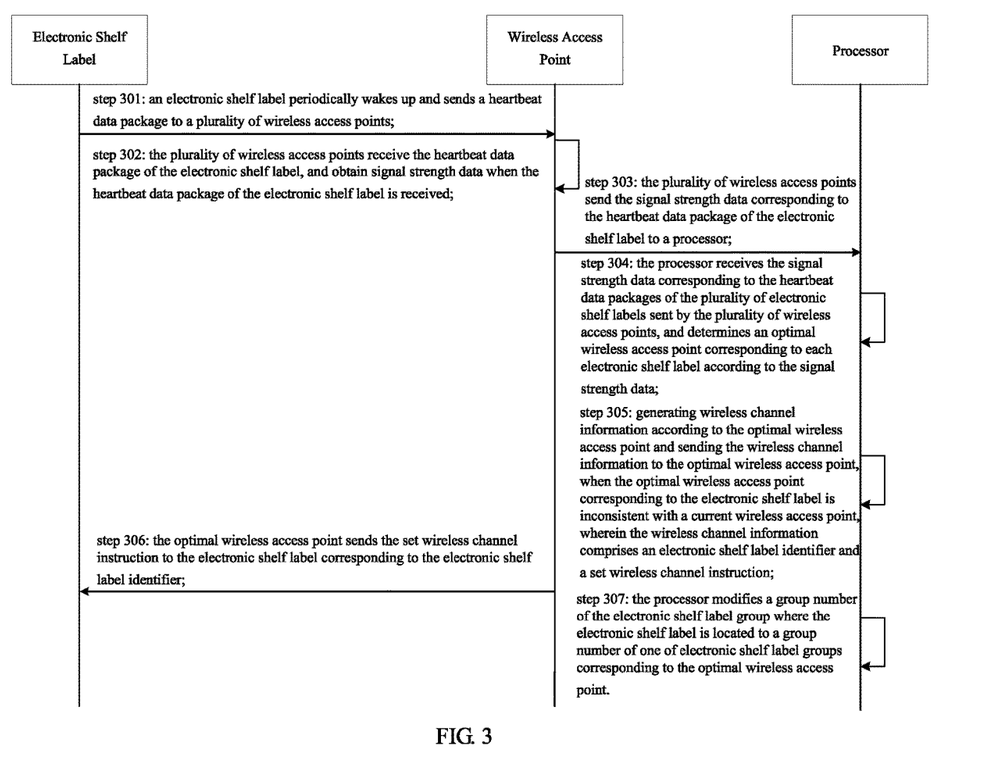
FIG. 3 is a detailed flowchart of determining an optimal wireless access point using an electronic shelf label communication system in an embodiment of the present disclosure.

Based on the above embodiments, an embodiment is given below to explain a detailed process of determining an optimal wireless access point using an electronic shelf label communication system. FIG. 3 is a detailed flowchart of determining an optimal wireless access point using an electronic shelf label communication system in an embodiment of the present disclosure. As illustrated in FIG. 3, the flow comprises:

step 301: an electronic shelf label periodically wakes up and sends a heartbeat data package to a plurality of wireless access points;

step 302: the plurality of wireless access points receive the heartbeat data package of the electronic shelf label, and obtain signal strength data when the heartbeat data package of the electronic shelf label is received;

step 303: the plurality of wireless access points send the signal strength data corresponding to the heartbeat data package of the electronic shelf label to a processor;

step 304: the processor receives the signal strength data corresponding to the heartbeat data packages of the plurality of electronic shelf labels sent by the plurality of wireless access points, and determines an optimal wireless access point corresponding to each electronic shelf label according to the signal strength data;

step 305: generating wireless channel information according to the optimal wireless access point and sending the wireless channel information to the optimal wireless access point, when the optimal wireless access point corresponding to the electronic shelf label is inconsistent with a current wireless access point, wherein the wireless channel information comprises an electronic shelf label identifier and a set wireless channel instruction;

step 306: the optimal wireless access point sends the set wireless channel instruction to the electronic shelf label corresponding to the electronic shelf label identifier;

step 307: the processor modifies a group number of the electronic shelf label group where the electronic shelf label is located to a group number of one of electronic shelf label groups corresponding to the optimal wireless access point.

Of course, it can be understood that although a detailed process of a data update using an electronic shelf label communication system has been given above, any other process of a data update using an electronic shelf label communication system can also be derived according to the above embodiments, and relevant variations should fall within the scope of the present disclosure.

In the electronic shelf label communication system provided by the embodiments of the present disclosure, the electronic shelf label wakes up periodically to receive the group wakeup message; wakes up again according to each of the countdown durations for receiving the update data to receive the unreceived update data packages once, until all of the update data packages are received, so that the power consumption of the electronic shelf label in an unawakened state is very low. After the electronic shelf label requiring data update wakes up according to each of the countdown durations for receiving the update data, the wireless access point simultaneously sends the unsent update data packages corresponding to the electronic shelf label to electronic shelf labels requiring data update in a same electronic shelf label group, until all of the update data packages corresponding to the electronic shelf label are sent, so that there is a time interval, i.e., a countdown duration for receiving the update data, between different batches of sent update data packages of the same electronic shelf label, thereby proving the electronic shelf label with enough time to process the update data packages, and improving the communication efficiency of the plurality of electronic shelf label groups.

In addition, the processor determines, according to the signal strength data corresponding to the heartbeat data packages of the plurality of electronic shelf labels sent by the plurality of wireless access points, an optimal wireless access point corresponding to each electronic shelf labels and networks the electronic shelf label according to the optimal wireless access point, when the optimal wireless access point corresponding to the electronic shelf label is inconsistent with the current wireless access point. The electronic shelf label communication system can achieve the highest communication efficiency while giving considerations to the low power consumption.

The embodiments of the present disclosure further provide two electronic shelf label communication methods. Since the principle of technical solution of the electronic shelf label communication methods is similar to that of the electronic shelf label communication system, the repetitive description is omitted herein.

Figure 4:
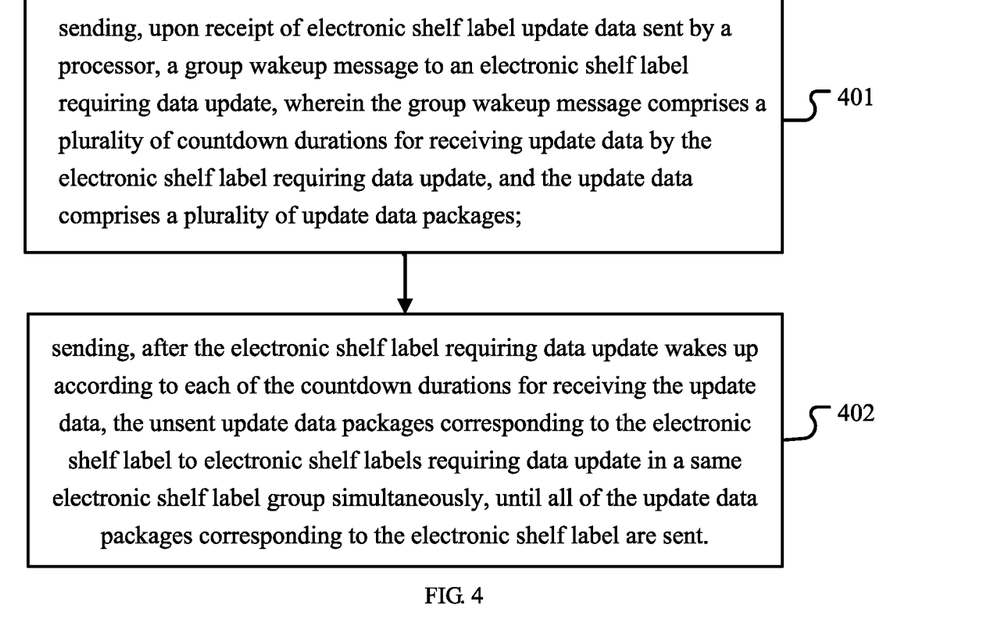
FIG. 4 is a flowchart of an electronic shelf label communication method in an embodiment of the present disclosure.

FIG. 4 is a flowchart of an electronic shelf label communication method in an embodiment of the present disclosure. As illustrated in FIG. 4, the method comprises:

step 401: sending, upon receipt of electronic shelf label update data sent by a processor, a group wakeup message to an electronic shelf label requiring data update, wherein the group wakeup message comprises a plurality of countdown durations for receiving update data by the electronic shelf label requiring data update, and the update data comprises a plurality of update data packages; and step 402: sending, after the electronic shelf label requiring data update wakes up according to each of the countdown durations for receiving the update data, the unsent update data packages corresponding to the electronic shelf label to electronic shelf labels requiring data update in a same electronic shelf label group simultaneously, until all of the update data packages corresponding to the electronic shelf label are sent.

In step 401, a subject for implementing the method may be a wireless access point, which sends a group wakeup message to the electronic shelf label requiring data update upon receipt of the electronic shelf label update data sent by the processor. At this time, the electronic shelf label should be in an awake state. Therefore, to make the electronic shelf label able to receive the group wakeup message, a duration of sending the group wakeup message by the wireless access point should cover the time interval between two times of waking up of the electronic shelf label to receive the group wakeup message. The group wakeup message includes a plurality of countdown durations for receiving the update data by the electronic shelf label requiring data update, and the update data comprises a plurality of update data packages. In step 402, after the electronic shelf label requiring data update wakes up according to each of the countdown durations for receiving the update data, the wireless access point simultaneously sends the unsent update data packages corresponding to the electronic shelf label to electronic shelf labels requiring data update in a same electronic shelf label group, until all of the update data packages corresponding to the electronic shelf label are sent, so that there is a time interval, i.e., a countdown duration for receiving the update data, between different batches of update data packages of the same electronic shelf label, thereby giving the electronic shelf label enough time to process the update data packages, and improving the communication efficiency of the plurality of electronic shelf label groups, thus effectively considering the group communication efficiency and the low power consumption of each of the electronic shelf labels.

In one embodiment, the electronic shelf label communication method further comprises:

receiving a heartbeat data package of the electronic shelf label and obtaining signal strength data when the heartbeat data package of the electronic shelf label is received, wherein the heartbeat data package of the electronic shelf label is sent by the electronic shelf label when waking up periodically; and sending the signal strength data corresponding to the heartbeat data package of the electronic shelf label, wherein the signal strength data corresponding to the heartbeat data package is configured to determine an optimal wireless access point corresponding to the electronic shelf label.

In the above embodiment, a subject for implementing the method may be a wireless access point, and a process of determining an optimal wireless access point corresponding to the electronic shelf labels may be completed by any other device, such as a processor. The processor receives the signal strength data corresponding to the heartbeat data packages of the plurality of electronic shelf labels sent by the plurality of wireless access points, and determines an optimal wireless access point corresponding to each electronic shelf labels according to the received signal strength data; and networks the electronic shelf labels according to the optimal wireless access point, when the optimal wireless access point corresponding to the electronic shelf label is inconsistent with a current wireless access point.

In the electronic shelf label communication method provided by the embodiments of the present disclosure, after electronic shelf label update data sent by a processor is received, a group wakeup message is sent to an electronic shelf label requiring data update, wherein the group wakeup message comprises a plurality of countdown durations for receiving the update data by the electronic shelf label requiring data update, and the update data comprises a plurality of update data packages. In the above process, the electronic shelf label wakes up periodically to receive the group wakeup message, so that the power consumption of the electronic shelf label in an unawakened state is very low. Then, after the electronic shelf label requiring data update wakes up according to each of the countdown durations for receiving the update data, the unsent update data packages corresponding to the electronic shelf label are simultaneously sent to electronic shelf labels requiring data update in a same electronic shelf label group, until all of the update data packages corresponding to the electronic shelf label are sent, so that there is a time interval, i.e., a countdown duration for receiving the update data, between different batches of sent update data packages of the same electronic shelf label, thereby providing the electronic shelf label with enough time to process the update data packages, and improving the communication efficiency of the plurality of electronic shelf label groups.

In addition, the signal strength data corresponding to the heartbeat data package may be configured to determine an optimal wireless access point corresponding to the electronic shelf label, thereby achieving an optimal matching between the electronic shelf label and the wireless access point, so that the electronic shelf label communication system can achieve the highest communication efficiency while considering low power consumption.

Figure 5:
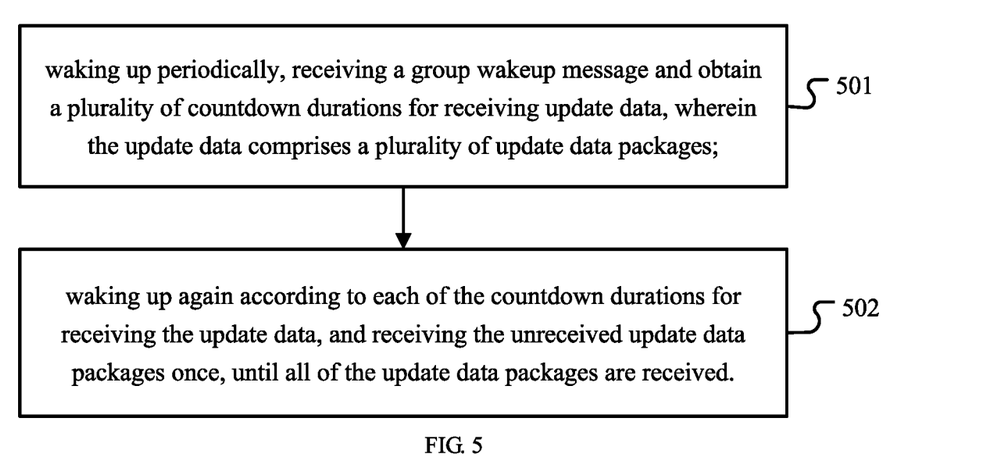
FIG. 5 is a flowchart of another electronic shelf label communication method in an embodiment of the present disclosure.

FIG. 5 is a flowchart of another electronic shelf label communication method in an embodiment of the present disclosure. As illustrated in FIG. 5, the method comprises:

step 501: waking up periodically, receiving a group wakeup message and obtain a plurality of countdown durations for receiving update data, wherein the update data comprises a plurality of update data packages; and step 502: waking up again according to each of the countdown durations for receiving the update data, and receiving the unreceived update data packages once, until all of the update data packages are received.

In step 501, a subject for implementing the method may be an electronic shelf label, which is in an unawakened state by default, so that the power consumption of the electronic shelf label in the unawakened state is very low. If the electronic shelf label requires data update, then in step 502, the electronic shelf label wakes up according to each of the countdown durations for receiving the update data to receive the unreceived update data packages once, until all of the update data packages are received, so that there is a time interval, i.e., a countdown duration for receiving the update data, between different batches of update data packages of the same electronic shelf label, thereby providing the electronic shelf label with enough time to process the update data packages, and improving the communication efficiency of the plurality of electronic shelf label groups.

In one embodiment, the electronic shelf label communication method further comprises: sending a heartbeat data package to a plurality of wireless access points after waking up periodically, and obtaining signal strength data when the heartbeat data package is received by the wireless access points, wherein the signal strength data corresponding to the heartbeat data package is configured to determine an optimal wireless access points corresponding to the electronic shelf label.

In the above embodiment, a subject for implementing the method may be an electronic shelf label. The signal strength data corresponding to the heartbeat data package is finally sent to the processor by the wireless access point; the processor receives the signal strength data corresponding to the heartbeat data packages of the plurality of electronic shelf labels sent by the plurality of wireless access points, and determines an optimal wireless access point corresponding to each electronic shelf label according to the signal strength data, and when the optimal wireless access point corresponding to the electronic shelf label is inconsistent with a current wireless access point, networks the electronic shelf label according to the optimal wireless access point, thereby achieving an optimal matching between the electronic shelf label and the wireless access point, and achieving the highest communication efficiency while considering low power consumption.

In the electronic shelf label communication method provided by the embodiments of the present disclosure, the electronic shelf label is in an unawakened state by default, so that the power consumption of the electronic shelf label is very low. Then, the electronic shelf label wakes up periodically to receive a group wakeup message, and obtain a plurality of countdown durations for receiving update data, wherein the update data comprises a plurality of update data packages; and wakes up again according to each of the countdown durations for receiving the update data to receive the unreceived update data packages once, until all of the update data packages are received, so that there is a time interval, i.e., a countdown duration for receiving the update data, between different batches of update data packages of the same electronic shelf label, thereby providing the electronic shelf label with enough time to process the update data packages, and improving the communication efficiency of the plurality of electronic shelf label groups.

In addition, the signal strength data corresponding to the heartbeat data package may be configured to determine an optimal wireless access point corresponding to the electronic shelf label, so as to achieve the highest communication efficiency while considering low power consumption.

Based on the same inventive concept, the embodiments of the present disclosure further provide two electronic shelf label communication apparatuses as described in the following embodiments. Since the principle of technical solution of the electronic shelf label communication apparatus is similar to that of the electronic shelf label communication method, the method as described above may be referred to for implementation of the electronic shelflabel communication apparatus, and the repetitive description is omitted herein.

Figure 6:
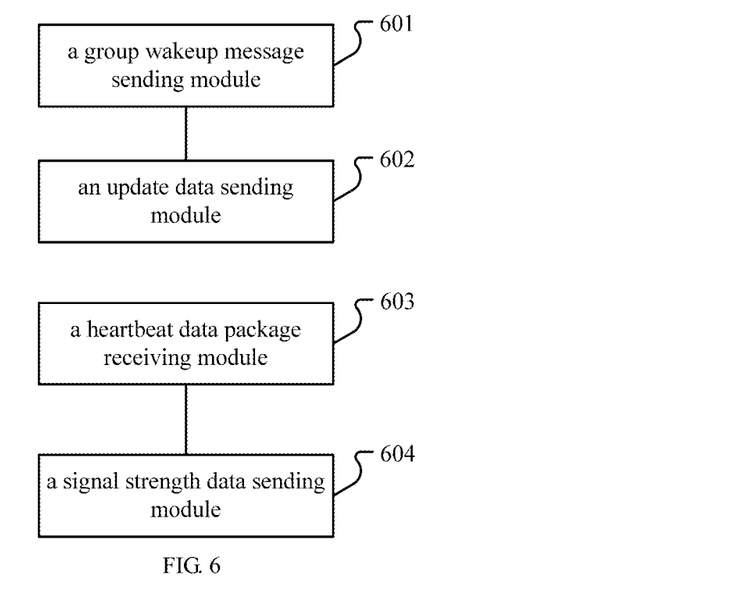
FIG. 6 is a schematic diagram of an electronic shelf label communication apparatus in an embodiment of the present disclosure.

FIG. 6 is a schematic diagram of an electronic shelf label communication apparatus in an embodiment of the present disclosure. As illustrated in FIG. 6, the apparatus comprises:

a group wakeup message sending module 601 configured to send, upon receipt of the electronic shelf label update data sent by a processor, a group wakeup message to an electronic shelf label requiring data update, wherein the group wakeup message comprises a plurality of countdown durations for receiving update data by the electronic shelf label requiring data update, and the update data comprises a plurality of update data packages; and an update data sending module 602 configured to send, after the electronic shelf label requiring data update wakes up according to each of the countdown durations for receiving the update data, the unsent update data packages corresponding to the electronic shelf label to electronic shelf labels requiring data update in a same electronic shelf label group simultaneously, until all of the update data packages corresponding to the electronic shelf label are sent.

In one embodiment, the electronic shelf label communication apparatus further comprises:

a heartbeat data package receiving module 603 configured to receive a heartbeat data package of the electronic shelf label and obtain signal strength data when the heartbeat data package of the electronic shelf label is received, wherein the heartbeat data package of the electronic shelf label is sent by the electronic shelf label when waking up periodically; and a signal strength data sending module 604 configured to send the signal strength data corresponding to the heartbeat data package of the electronic shelf label, wherein the signal strength data corresponding to the heartbeat data package is configured to determine an optimal wireless access point corresponding to the electronic shelf label.

In the electronic shelf label communication apparatus provided by the embodiments of the present disclosure, after electronic shelf label update data sent by a processor is received, a group wakeup message is sent to an electronic shelf label requiring data update, wherein the group wakeup message comprises a plurality of countdown durations for receiving the update data by the electronic shelf label requiring data update, and the update data comprises a plurality of update data packages. In the above process, the electronic shelf label wakes up periodically to receive the group wakeup message, so that the power consumption of the electronic shelf label in an unawakened state is very low. Then, after the electronic shelf label requiring data update wakes up according to each of the countdown durations for receiving the update data, the unsent update data packages corresponding to the electronic shelf label are simultaneously sent to electronic shelf labels requiring data update in a same electronic shelf label group, until all of the update data packages corresponding to the electronic shelf label are sent, so that there is a time interval, i.e., a countdown duration for receiving the update data, between different batches of sent update data packages of the same electronic shelf label, thereby providing the electronic shelf label with enough time to process the update data packages, and improving the communication efficiency of the plurality of electronic shelf label groups.

In addition, the signal strength data corresponding to the heartbeat data package may be configured to determine an optimal wireless access point corresponding to the electronic shelf label, thereby achieving an optimal matching between the electronic shelf label and the wireless access point, so that the electronic shelf label communication system can achieve the highest communication efficiency while considering low power consumption.

Figure 7:
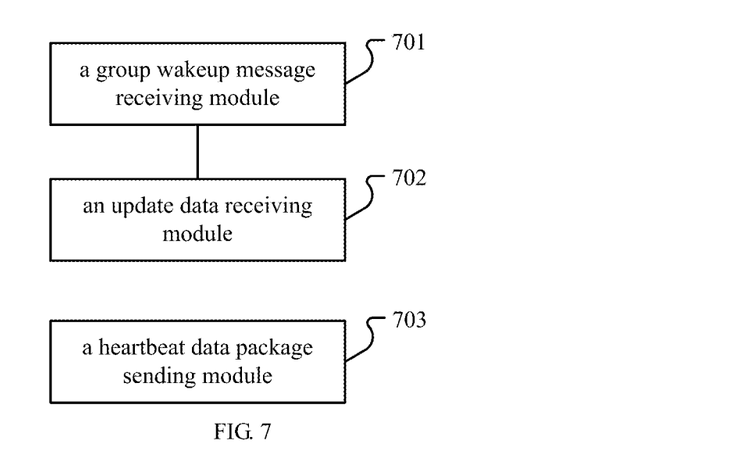
FIG. 7 is a schematic diagram of another electronic shelf label communication apparatus in an embodiment of the present disclosure.

FIG. 7 is a schematic diagram of another electronic shelf label communication apparatus in an embodiment of the present disclosure. As illustrated in FIG. 7, the apparatus comprises:

- a group wakeup message receiving module 701 configured to wake up periodically, receive a group wakeup message; and obtain a plurality of countdown durations for receiving update data, wherein the update data comprises a plurality of update data packages; and
- an update data receiving module 702 configured to wake up again according to each of the countdown durations for receiving the update data, and receive the unreceived update data packages once, until all of the update data packages are received.

In one embodiment, electronic shelf label communication apparatus further comprises: a heartbeat data package sending module 703 configured to send a heartbeat data package to a plurality of wireless access points after waking up periodically, and obtain signal strength data when the heartbeat data package is received by the wireless access points, wherein the signal strength data corresponding to the heartbeat data package is configured to determine an optimal wireless access point corresponding to electronic shelf label.

In the electronic shelf label communication apparatus provided by the embodiments of the present disclosure, the electronic shelf label is in an unawakened state by default, so that the power consumption of the electronic shelf label is very low. Then, the electronic shelf label wakes up periodically to receive a group wakeup message, and obtain a plurality of countdown durations for receiving update data, wherein the update data comprises a plurality of update data packages; and wakes up again according to each of the countdown durations for receiving the update data to receive unreceived update data packages once, until all of the update data packages are received, so that there is a time interval, i.e., a countdown duration for receiving the update data, between different batches of update data packages of the same electronic shelf label, thereby providing the electronic shelf label with enough time to process the update data packages, and improving the communication efficiency of the plurality of electronic shelf label groups.

In addition, the signal strength data corresponding to the heartbeat data package may be configured to determine an optimal wireless access point corresponding to the electronic shelf label, so as to achieve the highest communication efficiency while considering low power consumption.

Those skilled in the art should understand that the embodiments of this disclosure can be provided as methods, systems or computer program products. Therefore, this disclosure may be implemented in the form of fully-hardware embodiments, fully-software embodiments, or combined software-hardware embodiments. In addition, this disclosure may employ the form of a computer program product implemented on one or more computer storage medium (including but not limited to disk memory, CD-ROM, and optical memory) containing computer programming code.

This disclosure is set forth by referring to flow charts and/or block diagrams for the methods, devices (systems), and computer program products of the embodiments. It should be understood that each process and/or block of the flow charts and/or block diagrams as well as combinations of the processes and/or boxes of the flow charts and/or block diagrams can be realized by computer program instructions.

These computer program instructions can be provided to general-purpose computers, special-purpose computers, embedded processors or the processors of other programmable data processing devices to produce a machine, so that an apparatus for implementing the functions designated in one or more processes of the flowcharts and/or one or more blocks of the block diagrams can be produced by the instructions executed by the processor of the computer or other programmable data processing device.

These computer program instructions can also be stored in a computer-readable storage medium which can guide a computer or other programmable data processing device to operate in a particular way, so that an article of manufacture comprising an instruction apparatus can be produced by the instructions stored in the storage medium, with the instruction apparatus implementing the functions designated in one or more processes of the flowcharts and/or one or more blocks of the block diagram.

These computer program instructions may also be loaded onto a computer or other programmable data processing device to make the computer or other programmable data processing device perform a sequence of computer-implemented operations, so that the instructions executed by the computer or other programmable data processing device realize one or more processes of the flowcharts and/or one or more blocks of the block diagram.

The purpose, technical features and technical effects of the present disclosure have been further described above by means of some embodiments. It should be understood that the embodiments are meant to facilitate understanding of the principles of the present disclosure, and those skilled in the art can make any modifications based on the teachings of this disclosure. This specification shall not be construed as any limitation to the present disclosure.

What is claimed is:

1. An electronic shelf label communication system, comprising a processor, a plurality of wireless access points and an electronic shelf label, wherein
    the electronic shelf label is configured to actively send a heartbeat data package to the plurality of wireless access points after periodically waking up;
    each of the plurality of wireless access points is configured to: receive the heartbeat data package of the electronic shelf label, obtain signal strength data when the heartbeat data package of the electronic shelf label is received, and send the signal strength data to the processor;
    the processor is configured to: receive the signal strength data corresponding to the heartbeat data package sent by the plurality of wireless access points, and determine an optimal wireless access point corresponding to the electronic shelf label according to the signal strength data;
    the processor is configured to: generate and send wireless channel information to the optimal wireless access point, wherein the wireless channel information comprises an electronic shelf label identifier, and a set wireless channel instruction; and
    the optimal wireless access point is configured to send the set wireless channel instruction to the electronic shelf label corresponding to the electronic shelf label identifier, to allow the electronic shelf label to establish a corresponding relationship between the optimal wireless access point and the electronic shelf label according to the set wireless channel instruction.

2. The electronic shelf label communication system according to claim 1, wherein the processor is further configured to:
  network the electronic shelf label according to the optimal wireless access point, when the optimal wireless access point corresponding to the electronic shelf label is inconsistent with a current wireless access point.

3. The electronic shelf label communication system according to claim 2, wherein the system comprises a plurality of electronic shelf label groups, each of the wireless access points is corresponding to a plurality of electronic shelf label groups, and each of the electronic shelf label groups comprises a plurality of electronic shelf labels;
  the processor is further configured to:
    modify a group number of the electronic shelf label group where the electronic shelf label is located into a group number of one of the electronic shelf label groups corresponding to the optimal wireless access point.

4. The electronic shelf label communication system according to claim 1, wherein the system comprises a plurality of electronic shelf labels;
  the processor is configured to send update data, wherein the update data comprises a plurality of update data packages;
  the wireless access point is configured to:
    receive the update data; and
    send the update data packages to the electronic shelf labels, wherein the update data packages sent adjacent in time by the wireless access point are sent to different electronic shelf labels.

5. The electronic shelf label communication system according to claim 4, wherein
  the system comprises a plurality of electronic shelf label groups, each of the wireless access points is corresponding to a plurality of electronic shelf label groups, and each of the electronic shelf label groups comprises a plurality of electronic shelf labels;
  the processor is configured to send the update data to the wireless access point corresponding to the electronic shelf label group where the electronic shelf label requiring data update is located;
  the wireless access point is configured to:
    send, upon receipt of the update data sent by the processor, a group wakeup message to the electronic shelf label requiring data update, wherein the group wakeup message comprises a plurality of countdown durations for receiving update data by the electronic shelf label requiring data update; and
    send, after the electronic shelf label requiring data update wakes up according to each of the countdown durations for receiving update data, the unsent update data packages corresponding to the electronic shelf labels to the electronic shelf labels requiring data update in a same electronic shelf label group simultaneously, until all of the update data packages corresponding to the electronic shelf labels are sent;
  the electronic shelf label is configured to:
    wake up periodically, receive the group wakeup message after waking up, and obtain the plurality of countdown durations for receiving update data; and
    wake up again according to each of the countdown durations for receiving update data, and receive the unreceived update data package once, until all of the update data packages are received, wherein there is a countdown duration for receiving update data between different batches of update data packages that are received by the same electronic shelf label.

6. The electronic shelf label communication system according to claim 4, wherein the update data comprises electronic shelf label display control information and at least one picture;
  the wireless access point is configured to:
    send the update data package that includes the picture and does not include the electronic shelf label display control information; and
    send the update data package that includes the electronic shelf label display control information and does not include the picture.

7. The electronic shelf label communication system according to claim 4, wherein the update data comprises an electronic shelf label identifier and at least one picture;
  the processor is configured to:
    generate, according to attribute information of a commodity, the at least one picture of the commodity; and
    generate the electronic shelf label identifier corresponding to the at least one picture of the commodity according to a binding relationship between the commodity and the electronic shelf label.

8. The electronic shelf label communication system according to claim 1, wherein the wireless access point is configured to turn on a heartbeat receiving function on a public wireless channel; and
  the electronic shelf label is configured to sends the heartbeat data package on the public channel to the wireless access point.

9. The electronic shelf label communication system according to claim 1, wherein the processor is configured to send update data that comprises a plurality of update data packages;
  wherein the update data comprises electronic shelf label display control information and at least one picture, and the wireless access point is configured to:
  receive the update data from the processor;
  send the update data package that includes the picture and does not include the electronic shelf label display control information to the electronic shelf label; and
  send the update data package that includes the electronic shelf label display control information and does not include the picture to the electronic shelf label.

10. An electronic shelf label communication method comprising:
  actively sending, by an electronic shelf label, a heartbeat data package to a plurality of wireless access points after the electronic shelf label periodically wakes up, wherein signal strength data when the heartbeat data package is received by the wireless access points is obtained by the wireless access points and is sent to a processor by the wireless access points for being used by the processor to determine an optimal wireless access point corresponding to the electronic shelf label;
  receiving, by the electronic shelf label corresponding to an electronic shelf label identifier in wireless channel information, a set wireless channel instruction in the wireless channel information sent by the optimal wireless access point, wherein the wireless channel information is generated by the processor and is sent to the optimal wireless access point by the processor; and
  establishing, by the electronic shelf label corresponding to the electronic shelf label identifier, a corresponding relationship between the optimal wireless access point and the electronic shelf label according to the set wireless channel instruction.

11. The electronic shelf label communication method according to claim 10, wherein the method is applied to a plurality of electronic shelf labels;
the method further comprises:
receiving, by each electronic shelf label, an update data package in update data that is sent by the wireless access point, wherein the update data comprises a plurality of update data packages, and the update data packages sent adjacent in time by the wireless access point are sent to different electronic shelf labels.

12. The electronic shelf label communication method according to claim 11, wherein each of the wireless access points is corresponding to a plurality of electronic shelf label groups, and each of the electronic shelf label groups comprises a plurality of electronic shelf labels;
the method further comprises:
receiving, by the electronic shelf label, a group wakeup message after the electronic shelf label periodically wakes up, and obtaining, by the electronic shelf label, a plurality of countdown durations for receiving update data; and
receiving, by the electronic shelf label, an unreceived update data package once after the electronic shelf label wakes up again according to each of the countdown durations for receiving update data, until all of the update data packages are received, wherein there is a countdown duration for receiving update data between different batches of update data packages that are received by the same electronic shelf label.

13. The electronic shelf label communication method according to claim 11, wherein the update data comprises electronic shelf label display control information and at least one picture;
the method further comprises:
receiving, by the electronic shelf label, the update data package that includes the picture and does not include the electronic shelf label display control information;
receiving, by the electronic shelf label, the update data package that includes the electronic shelf label display control information and does not include the picture; and
displaying, by the electronic shelf label, the picture upon receipt of the electronic shelf label display control information.

14. The electronic shelf label communication method according to claim 10, further comprising:
sending, by the electronic shelf label, the heartbeat data package on a public channel to the wireless access point once the wireless access point turns on a heartbeat receiving function on the public wireless channel.

15. The electronic shelf label communication method according to claim 10, further comprising:
receiving, by the electronic shelf label and from the wireless access point, an update data package that includes a picture and does not include electronic shelf label display control information;
receiving, by the electronic shelf label and from the wireless access point, an update data package that includes the electronic shelf label display control information and does not include the picture; and
displaying, by the electronic shelf label, the picture upon receipt of the electronic shelf label display control information.

16. An electronic shelf label communication method comprising:
receiving, by a plurality of wireless access points, a heartbeat data package that is actively sent by an electronic shelf label, and obtaining, by the plurality of wireless access points, signal strength data when the heartbeat data package of the electronic shelf label is received;
sending, by the plurality of wireless access points, the signal strength data corresponding to the heartbeat data package to a processor, wherein the signal strength data is to be used by the processor to determine an optimal wireless access point corresponding to the electronic shelf label;
receiving, by the optimal wireless access point, wireless channel information generated and sent by the processor, wherein the wireless channel information comprises an electronic shelf label identifier and a set wireless channel instruction; and
sending, by the optimal wireless access point, the set wireless channel instruction to the electronic shelf label corresponding to the electronic shelf label identifier, to allow the electronic shelf label to establish a corresponding relationship between the optimal wireless access point and the electronic shelf label according to the set wireless channel instruction.

17. The electronic shelf label communication method according to claim 16, wherein the method further comprises:
receiving, by the wireless access point, update data sent by the processor, wherein the update data comprises a plurality of update data packages; and
sending, by the wireless access point, the update data packages to a plurality of electronic shelf labels, wherein the update data packages sent adjacent in time by the wireless access point are sent to different electronic shelf labels.

18. The electronic shelf label communication method according to claim 17, wherein each of the wireless access points is corresponding to a plurality of electronic shelf label groups, and each of the electronic shelf label groups comprises a plurality of electronic shelf labels;
the method further comprises:
sending, by the wireless access point, a group wakeup message to the electronic shelf label requiring data update, wherein the group wakeup message comprises a plurality of countdown durations for receiving update data by the electronic shelf label requiring data update; and
sending, by the wireless access point and after the electronic shelf label requiring data update wakes up according to each of the countdown durations for receiving update data, the unsent update data packages corresponding to the electronic shelf labels to the electronic shelf labels requiring data update in a same electronic shelf label group simultaneously, until all of the update data packages corresponding to the electronic shelf labels are sent, wherein there is a countdown duration for receiving update data between different batches of update data packages that are sent to the same electronic shelf label.

19. The electronic shelf label communication method according to claim 17, wherein the update data comprises electronic shelf label display control information and at least one picture;
the method comprises:
sending, by the wireless access point, the update data package that includes the picture and does not include the electronic shelf label display control information to the electronic shelf label; and sending, by the wireless access point, the update data package that includes the electronic shelf label display control information and does not include the picture to the electronic shelf label.

20. The electronic shelf label communication method according to claim 16, further comprising:

receiving, by the wireless access point, update data sent by the processor, wherein the update data comprises a plurality of update data packages, and the update data comprises electronic shelf label display control information and at least one picture;

sending, by the wireless access point, the update data package that includes the picture and does not include the electronic shelf label display control information to the electronic shelf label; and sending, by the wireless access point, the update data package that includes the electronic shelf label display control information and does not include the picture to the electronic shelf label.

* * * * *